(12) United States Patent
Liu (10) Patent No.: US 12,358,437 B2
(45) Date of Patent: Jul. 15, 2025

(54) WIRELESS CAR CHARGER MOUNT

(71) Applicant: Volant Roc Electronics Tech Co., Ltd., Guangdong (CN)

(72) Inventor: Jianbo Liu, Guangdong (CN)

(73) Assignee: Volant Roc Electronics Tech Co., Ltd., Huizhou (CN)

( * ) Notice: Subject to any disclaimer, the term of this patent is extended or adjusted under 35 U.S.C. 154(b) by 271 days.

(21) Appl. No.: 18/199,915

(22) Filed: May 19, 2023

(65) Prior Publication Data
US 2023/0373403 A1    Nov. 23, 2023

(30) Foreign Application Priority Data
May 19, 2022    (CN) .......................... 202221205946.8

(51) Int. Cl.
*B60R 11/02*    (2006.01)
*H02J 7/00*    (2006.01)
*H02J 50/00*    (2016.01)
*H04M 1/06*    (2006.01)
*B60R 11/00*    (2006.01)

(52) U.S. Cl.
CPC ........ *B60R 11/0241* (2013.01); *H02J 7/0044* (2013.01); *H02J 50/005* (2020.01); *H04M 1/06* (2013.01); *B60R 2011/0071* (2013.01)

(58) Field of Classification Search
CPC .... H04M 1/06; H04M 1/04; H04M 1/724098; B60R 11/0241; B60R 2011/0071; B60R 11/02; H02J 7/0044; H02J 50/005; H02J 50/10; H02J 50/90
See application file for complete search history.

(56) References Cited

FOREIGN PATENT DOCUMENTS

EP    3892498 A1 *  10/2021    ......... B60R 11/0241

* cited by examiner

*Primary Examiner* — Tuan D Nguyen (57) ABSTRACT

A wireless car charger mount includes a magnetic adsorption portion and two clamping members provided on symmetric sides of the magnetic adsorption portion. The two clamping members are arranged in parallel, and the clamping members and the magnetic adsorption portion are perpendicular to each other. The clamping members are detachably connected to the magnetic adsorption portion through a steering structure, and the clamping members are adjusted and fixed in any direction on a vertical line perpendicular to the magnetic adsorption portion. The present disclosure solves the problem that when a mobile phone is designed with a built-in magnet, a magnetic force is greatly weakened due to the installation of a mobile phone case, such that the mobile phone cannot be firmly fixed on a magnetic adsorption support, and falls from the magnetic adsorption support easily, which affects the fixation of a vehicle-mounted mobile phone.

9 Claims, 6 Drawing Sheets

WIRELESS CAR CHARGER MOUNT

CROSS REFERENCE TO RELATED APPLICATIONS

The present application claims the benefit of Chinese Patent Application No. 202221205946.8 filed on May 19, 2022, the contents of which are incorporated herein by reference in their entirety.

TECHNICAL FIELD

The present disclosure relates to the technical field of mobile phone mounts, and in particular, to a wireless car charger mount.

BACKGROUND

A mobile phone mount mainly applies the principle of mechanics to make a mobile phone have a support point, such that the mobile phone can be placed upright or obliquely on a horizontal object. According to fixing positions and fixing modes, there are desktop mobile phone mounts, bedside mobile phone mounts, wall-mounted mobile phone mounts, vehicle-mounted mobile phone mounts, and ring buckle mobile phone mounts.

The existing mobile phone is designed with a built-in magnet that can be adsorbed on a corresponding magnet support. However, when a mobile phone case is installed, a magnetic force is greatly weakened due to the thickness of the mobile phone case, such that the mobile phone cannot be firmly attached to the magnet support.

Therefore, a wireless car charger mount comes into being.

SUMMARY

The content of the present disclosure is to provide a wireless car charger mount, which mainly solves the problem that when a mobile phone is designed with a built-in magnet, a magnetic force is greatly weakened due to the installation of a mobile phone case, such that the mobile phone cannot be firmly fixed on a magnetic adsorption support, and falls from the magnetic adsorption support easily, which affects the fixation of a vehicle-mounted mobile phone.

The present disclosure provides a wireless car charger mount, including a magnetic adsorption portion and two clamping members provided on symmetric sides of the magnetic adsorption portion, where the two clamping members are arranged in parallel, and the clamping members and the magnetic adsorption portion are perpendicular to each other; and the clamping members are detachably connected to the magnetic adsorption portion through a steering structure, and the clamping members are adjusted and fixed in any direction on a vertical line perpendicular to the magnetic adsorption portion.

Preferably, the clamping member includes a fixing member and a cover plate arranged in parallel; the steering structure includes a bolt and a rotating shaft; a recess arranged with the cover plate in a clearance manner is formed in the fixing member, and a first fixing hole and a second fixing hole for the rotating shaft to pass through and fix are respectively formed in a bottom of the recess and the magnetic adsorption portion; the fixing member is capable of rotating around the first fixing hole; and a through hole for the bolt to fix is formed in an end surface of the rotating shaft facing the cover plate.

Preferably, the steering structure further includes a first elastic member and a positioning member fixed to one end of the first elastic member; a positioning groove for the positioning member to clamp and fix is formed in a side surface of the rotating shaft, the other end of the first elastic member is fixedly arranged on an inner side surface of the recess, and the first elastic member is arranged between the rotating shaft and the inner side surface of the recess in an interference manner.

Preferably, the number of the first elastic members is equal to the number of the positioning members, and there are at least two first elastic members and at least two positioning members.

Preferably, the magnetic adsorption portion further includes a linkage structure detachably connected to the two clamping members, the linkage structure is disposed in a notch of the magnetic adsorption portion, and the second fixing holes accommodating the steering structure are respectively formed in both sides of the linkage structure.

Preferably, the linkage structure includes a gear and two transmission shafts engaged with the gear; strip-shaped holes are respectively formed in the two transmission shafts, and sawtooth structures are respectively provided on symmetric sides of the two strip-shaped holes; and the strip-shaped holes are arranged in parallel, are stacked outside the gear, and are separately engaged with the gear.

Preferably, two sides along a length direction of the strip-shaped holes are arc-shaped, and a limiting member radially extends from an end of one strip-shaped hole, the limiting member passes through the other strip-shaped hole, and a length of the limiting member is at most equal to a width of the gear.

Preferably, the linkage structure further includes a second elastic member; positioning columns are respectively provided on the two transmission shafts, both ends of the second elastic member are respectively fixed on the two positioning columns, and the second elastic member elongates a length thereof when the transmission shafts move away from each other.

Preferably, any transmission shaft is provided with two positioning columns located on the vertical line; and any two positioning columns on the two transmission shafts are located on a same horizontal line, and the second elastic member is sleeved outside the two positioning columns in a horizontal direction.

In view of the above, applying the technical solutions provided by the present disclosure can obtain the following beneficial effects:

First, on the mobile phone mount provided by the present disclosure, a mobile phone can be fixed by means of magnetic adsorption or clamping; meanwhile, when a magnetic force is strong enough, the clamping members are turned, without affecting the magnetic-adsorption fixation of the mobile phone; and when the magnetic force is not enough, the mobile phone can be fixed by clamping, thereby improving the fastening effect of the mobile phone mount on the mobile phone;

Second, according to the mobile phone mount provided by the present disclosure, the rotating shaft and the second fixing hole are arranged, such that the rotating shaft is fixed; and the rotating shaft and the first fixing hole are arranged, such that the direction of the clamping members can be conveniently adjusted, and the fixing mode is adaptively modified;

Third, according to the mobile phone mount provided by the present disclosure, the first elastic member and the positioning member are arranged, such that the fixing member can implement fixation only at a specific rotating angle, thereby ensuring clamping and fixing of the mobile phone mount at a specific angle; and Four, according to the mobile phone mount provided by the present disclosure, the linkage structure controls the two clamping members to move at the same time, and the limiting member limits the moving range, such that the effect of opening and closing the clamping members multiple times can be ensured, thereby prolonging the service life of the mobile phone mount.

BRIEF DESCRIPTION OF THE DRAWINGS

To describe the technical solutions in the embodiment of the present disclosure or in the prior art more clearly, the following briefly introduces the accompanying drawings required for describing the embodiment or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION

The technical solutions in the embodiments of the present disclosure are clearly and completely described below with reference to the accompanying drawings in the embodiments of the present disclosure. Apparently, the described embodiments are merely a part, rather than all of the embodiments of the present disclosure. All other embodiments obtained by those of ordinary skill in the art based on the embodiments of the present disclosure without creative efforts shall fall within the protection scope of the present disclosure.

When a mobile phone is designed with a built-in magnet, a magnetic force is greatly weakened due to the installation of a mobile phone case, such that the mobile phone cannot be firmly fixed on a magnetic adsorption support, and falls from the magnetic adsorption support easily, which affects the fixation of a vehicle-mounted mobile phone.

As shown in FIG. 1 to FIG. 6, to solve the above problems, this embodiment provides a wireless car charger mount, mainly including a magnetic adsorption portion 10 and two clamping members 20 provided on symmetric sides of the magnetic adsorption portion 10. The two clamping members 20 are arranged in parallel, and the clamping members 20 and the magnetic adsorption portion 10 are perpendicular to each other. The clamping members 20 are detachably connected to the magnetic adsorption portion 10 through a steering structure, and the clamping members 20 are adjusted and fixed in any direction on a vertical line perpendicular to the magnetic adsorption portion 10.

Figure 1:
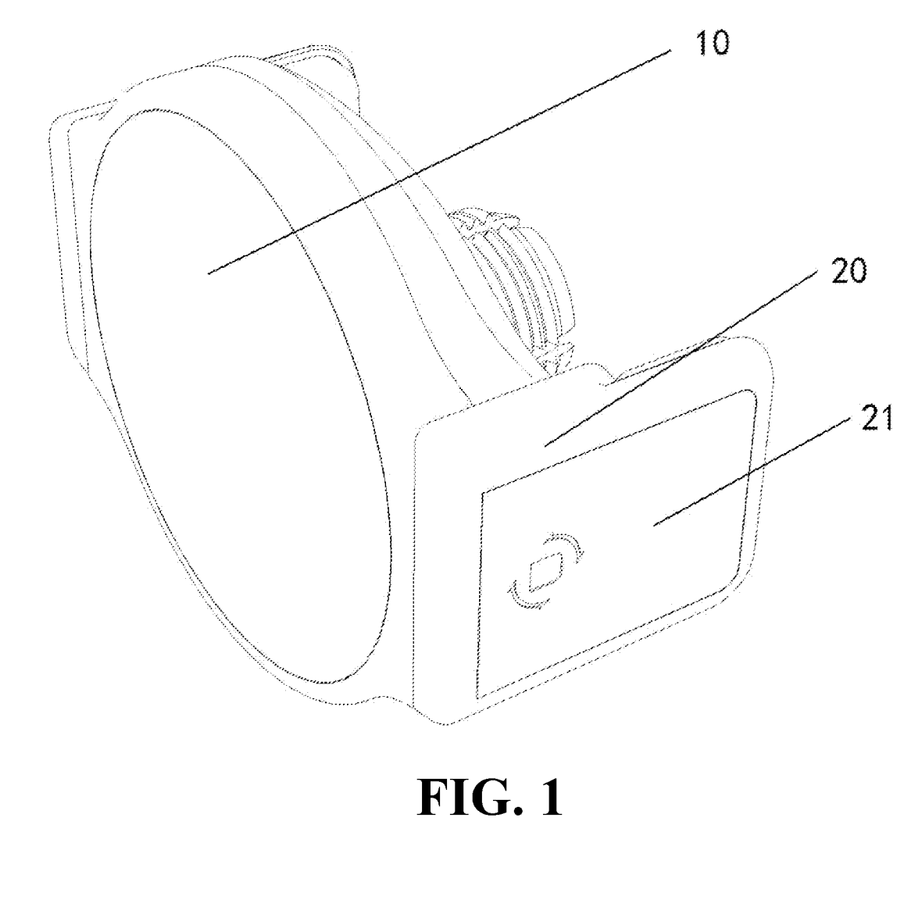
FIG. 1 is a schematic structural diagram of a mobile phone mount in embodiments of the present disclosure.

Preferably but not limited to, in this embodiment, the clamping members 20 are arranged on two symmetric sides of the magnetic adsorption portion 10 in parallel and are located on the vertical line perpendicular to the magnetic adsorption portion 10. Two directions are formed on the vertical line, enabling the clamping member 20 to clamp forward and the clamping member 20 to clamp rearward. When the clamping member 20 clamps forward, the magnetic-adsorption and clamping fixation effect of the mobile phone mount can be achieved.

Preferably but not limited to, in this embodiment, the surface of the magnetic adsorption portion 10 is a plane, and a primary coil should be provided in the magnetic adsorption portion 10 and react with a secondary coil inside the mobile phone to implement wireless charging. A magnetic member can be provided additionally to implement magnetic-adsorption fixation.

Figure 2:
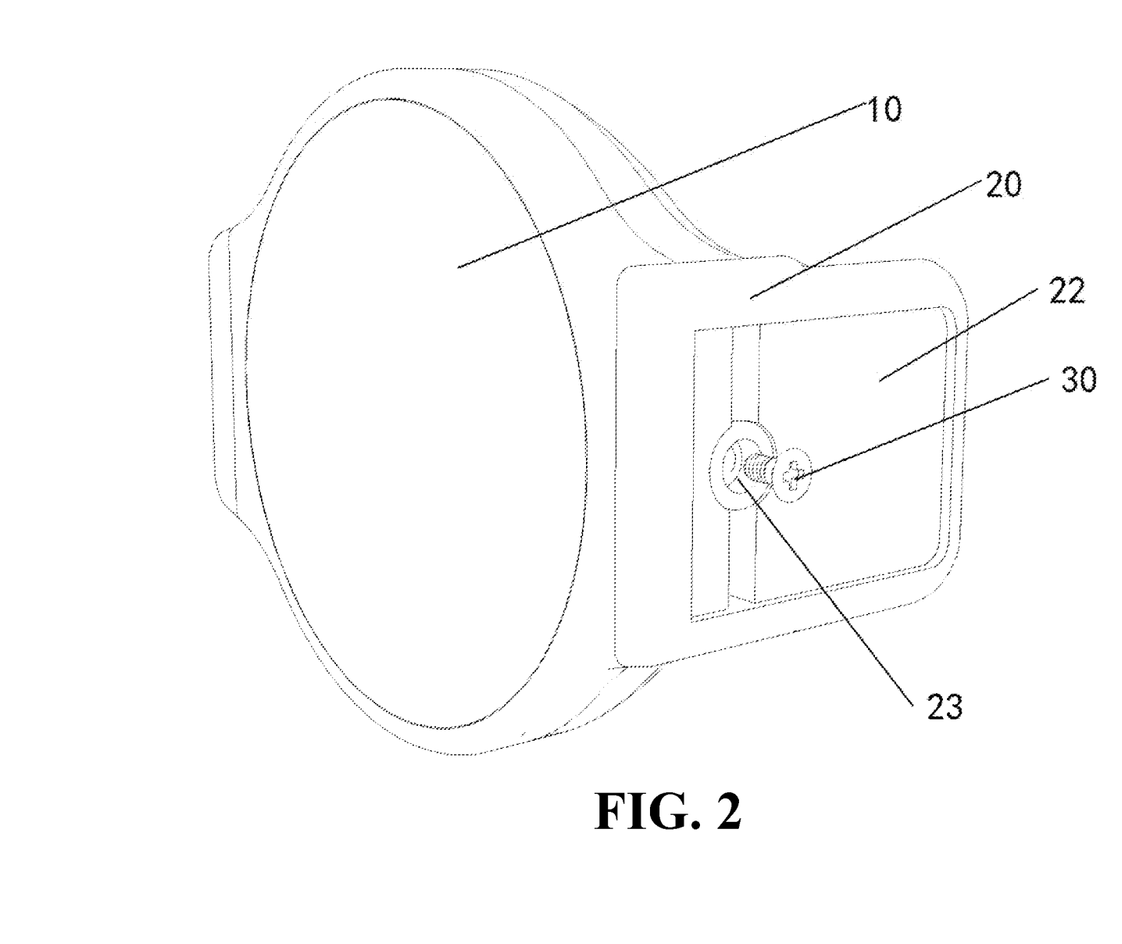
FIG. 2 is a partial schematic structural diagram of a clamping member of a mobile phone mount in embodiments of the present disclosure.
Figure 6:
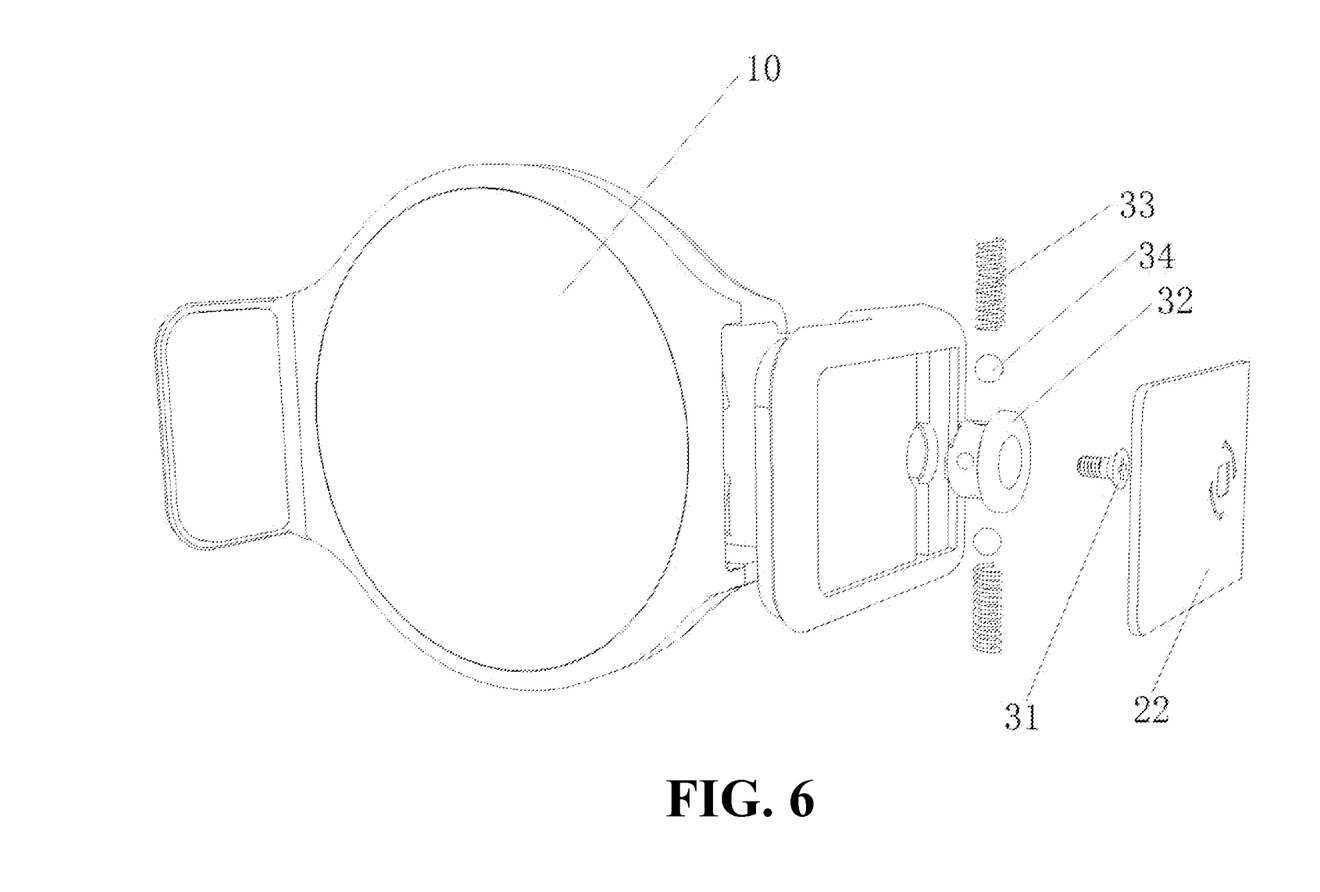
FIG. 6 is a partial exploded view of a steering structure of a mobile phone mount in embodiments of the present disclosure.

More specifically, the clamping member 20 includes a fixing member and a cover plate 22 arranged in parallel. The steering structure includes a bolt 31 and a rotating shaft 32. A recess 21 arranged with the cover plate 22 in a clearance manner is formed in the fixing member, and a first fixing hole 23 and a second fixing hole 60 for the rotating shaft 32 to pass through and fix are respectively formed in a bottom of the recess 21 and the magnetic adsorption portion 10. The fixing member is capable of rotating around the first fixing hole 23. A through hole for the bolt 31 to fix is formed in an end surface of the rotating shaft 32 facing the cover plate 22.

Preferably, in this embodiment, the first fixing hole 23 is a circular hole, and a cylindrical structure protrudes from the rotating shaft 32 and matches the first fixing hole 23. A prism should be provided at a free end of the cylindrical structure, and the prism matches the second fixing hole 60 in shape to keep a fixed angle of the rotating shaft 32. In this embodiment, after the rotating shaft 32 matches the second fixing hole 60, the fixing member can rotate around the rotating shaft 32. However, the rotating shaft 32 remains fixed due to the presence of the bolt 31, such that only the angular rotation of the clamping member 20 is achieved.

Preferably but not limited to, internal threads are provided in the first fixing hole 23 and the second fixing hole 60.

Figure 5:
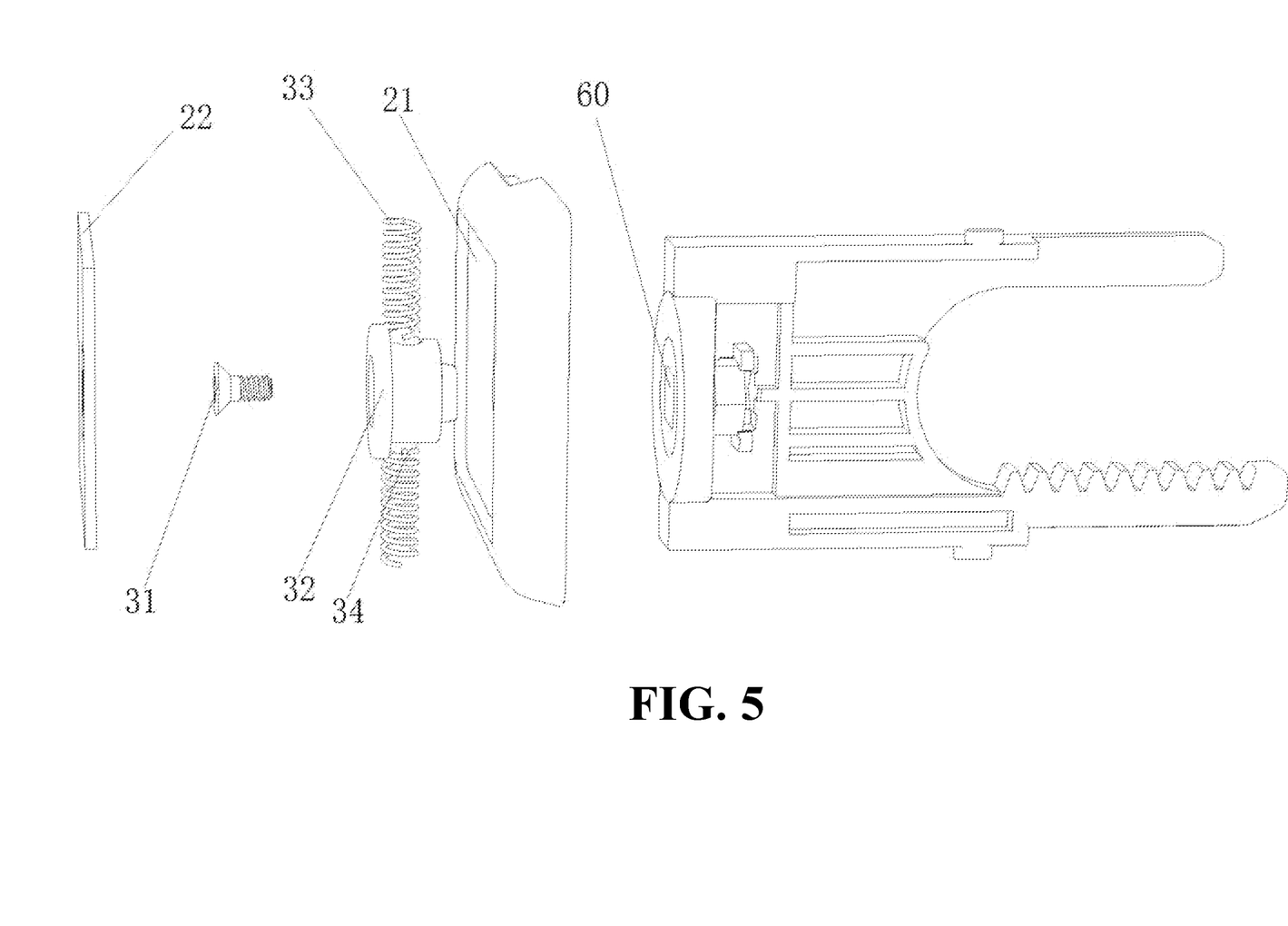
FIG. 5 is a specific schematic structural diagram of a steering structure of a mobile phone mount in embodiments of the present disclosure.

As shown in FIG. 5, more specifically, the steering structure further includes a first elastic member 33 and a positioning member 34 fixed to one end of the first elastic member 33. A positioning groove for the positioning member 34 to clamp and fix is formed in a side surface of the rotating shaft 32. The other end of the first elastic member 33 is fixedly arranged on an inner side surface of the recess 21, and the first elastic member 33 is arranged between the rotating shaft 32 and the inner side surface of the recess 21 in an interference manner.

Preferably, the number of the first elastic members 33 is equal to the number of the positioning members 34, and there are at least two first elastic members 33 and at least two positioning members 34.

Preferably but not limited to, in this embodiment, two positioning grooves are symmetrically formed in a side surface of the rotating shaft 32, such that the clamping member 20 is clamped and fixed with the positioning member 34 during forward fixation and rearward fixation. Or, in this embodiment, four positioning grooves are symmetrically arranged on a side surface of the rotating shaft 32 pairwise, such that the clamping member 20 is clamped and fixed with the positioning member 34 during forward fixation, 90° rotation and rearward fixation.

In this embodiment, after the installation of the bolt 31 and the rotating shaft 32 is completed, when the fixing member rotates, the first elastic member 33 and the positioning member 34 are escaped from the current positioning groove on the rotating shaft 32, and during rotation of the fixing member, a next positioning groove is searched for fixing.

Figure 3:
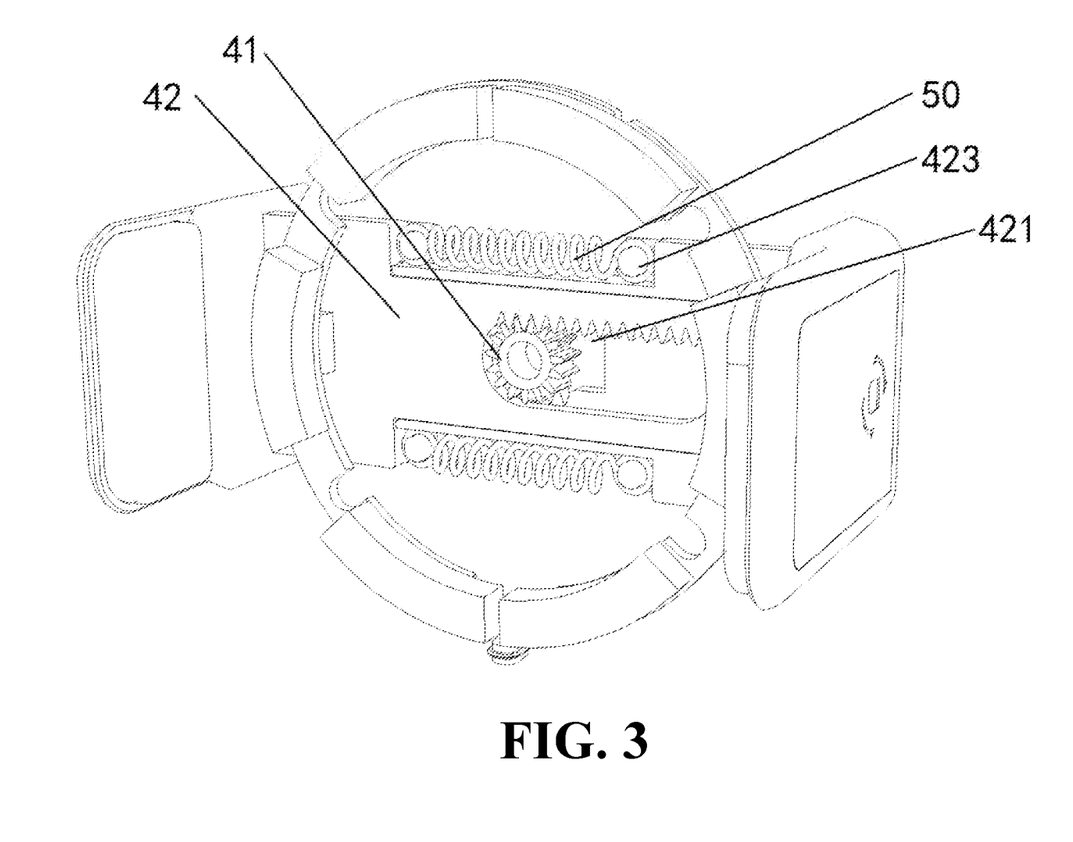
FIG. 3 is a partial schematic structural diagram of a magnetic adsorption portion of a mobile phone mount in embodiments of the present disclosure.
Figure 4:
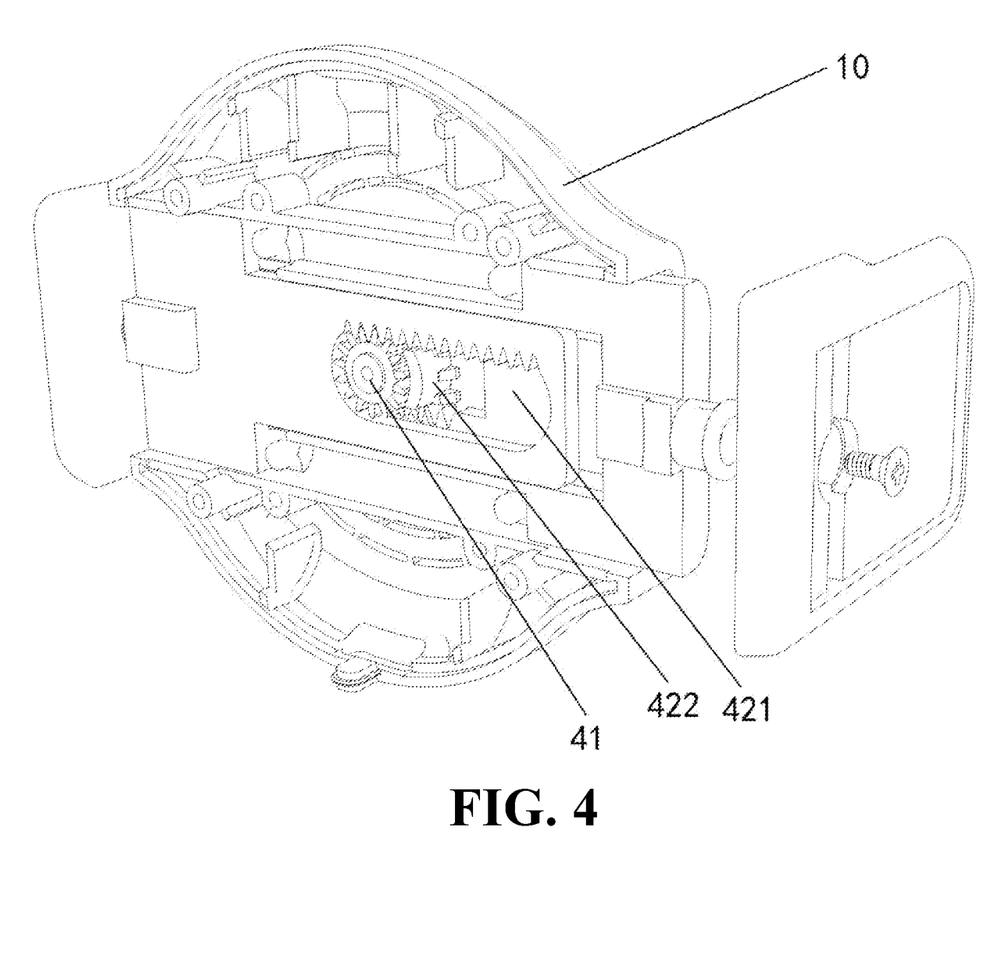
FIG. 4 is a partial schematic structural diagram of a magnetic adsorption portion of a mobile phone mount in embodiments of the present disclosure.

More specifically, the magnetic adsorption portion 10 further includes a linkage structure detachably connected to the two clamping members 20, and the magnetic adsorption portion 10 is provided with a notch accommodating the linkage structure. The linkage structure is disposed in the notch of the magnetic adsorption portion 10. The second fixing holes 60 accommodating the steering structure are respectively formed in both sides of the linkage structure.

Preferably but not limited to, in this embodiment, the linkage structure is built in the magnetic adsorption portion 10.

In this embodiment, the linkage structure implements synchronous movement of the two clamping members 20, and therefore, the linkage structure is detachably connected to the clamping members 20.

More specifically, the linkage structure includes a gear 41 and two transmission shafts 42 engaged with the gear 41. Strip-shaped holes 421 are respectively formed in the two transmission shafts 42, and sawtooth structures are respectively provided on symmetric sides of the two strip-shaped holes 421. The strip-shaped holes 421 are arranged in parallel, are stacked outside the gear 41, and are separately engaged with the gear 41.

Preferably but not limited to, in this embodiment, the strip-shaped holes 421 on different transmission shafts 42 have the same height, and the sawtooth structures are respectively arranged at the upper and lower ends of the strip-shaped holes 421 and engaged with the gear 41 from the symmetric sides.

Preferably but not limited to, in this embodiment, in an initial state, the gear 41 is separately located at the ends of different strip-shaped holes 421, and is clamped and fixed by the ends of two strip-shaped holes 421. When any clamping member 20 moves outward, the sawtooth structure on the corresponding strip-shaped hole 421 moves to drive the gear 41 to rotate, and the gear 41 drives the other strip-shaped hole 421 to move, i.e., the other clamping member 20 moves outward.

More specifically, two ends along a length direction of the strip-shaped holes 421 are arc-shaped, and a limiting member 422 radially extends from an end of one strip-shaped hole 421. The limiting member 422 passes through the other strip-shaped hole 421, and a length of the limiting member 422 is at most equal to a thickness of the other strip-shaped hole 421.

Preferably but not limited to, in this embodiment, in the initial state, both sides of the gear 41 are in contact with the two ends of the strip-shaped hole 421, and therefore are set to be arc-shaped structures, which can effectively accommodate the gear 41 and avoid wear.

In this embodiment, the limiting member 422 limits the maximum pulling range of the clamping member 20. When the transmission shaft 42 moves, the other end of the strip-shaped hole 421 gradually moves toward the gear 41. At this time, due to the existence of the limiting member 422, the limiting member 422 can pass through the other strip-shaped hole 421, such that the limiting member 422 can release the other end of the strip-shaped hole 421 and limit the clamping member 20 to move outward no longer.

More specifically, the linkage structure further includes a second elastic member 50. Positioning columns 423 are respectively provided on the two transmission shafts 42, and the second elastic member 50 is sleeved on the positioning columns 423 of different transmission shafts 42. The second elastic member 50 elongates a length thereof when the transmission shafts 42 move away from each other.

Preferably, any transmission shaft 42 is provided with two positioning columns 423 located on the vertical line. Any two positioning columns 423 on the two transmission shafts 42 are located on a same horizontal line, and the second elastic member 50 is sleeved outside the two positioning columns 423 in a horizontal direction.

Preferably but not limited to, in this embodiment, in the initial state, when the clamping member 20 is not under the action of an external force, the second elastic member 50 is in a balanced state. If the clamping member 20 is stressed to move outward, the second elastic member 50 is stretched and generates an elastic force to reset the clamping member 20.

More specifically, a thread member is further provided on a back surface of the magnetic adsorption portion 10.

In conclusion, the wireless car charger mount provided in this embodiment is mainly to achieve magnetic-adsorption fixation and clamping fixation at the same time by providing the direction-adjustable clamping members; and when only the magnetic-adsorption fixation is achieved, the interference of the clamping members is avoided, thereby improving the fixing effect of the mobile phone mount on the mobile phone.

The implementations described above do not constitute a limitation on the scope of protection of the technical solution of the present disclosure. Any modification, equivalent replacement, and improvement made within the spirit and principle of the above implementations should fall within the scope of protection of the technical solution of the present disclosure.

The invention claimed is:

1. A wireless car charger mount, comprising a magnetic adsorption portion and two clamping members provided on symmetric sides of the magnetic adsorption portion, wherein the two clamping members are arranged in parallel, the clamping members and the magnetic adsorption portion are perpendicular to each other, the clamping members are detachably connected to the magnetic adsorption portion through a steering structure, and the clamping members are adjusted and fixed in any direction on a vertical line perpendicular to the magnetic adsorption portion.

2. The wireless car charger mount according to claim 1, wherein the clamping member comprises a fixing member and a cover plate arranged in parallel; the steering structure comprises a bolt and a rotating shaft; a recess arranged with the cover plate in a clearance manner is formed in the fixing member, and a first fixing hole and a second fixing hole for the rotating shaft to pass through and fix are respectively formed in a bottom of the recess and the magnetic adsorption portion; the fixing member is capable of rotating around the first fixing hole; and a through hole for the bolt to fix is formed in an end surface of the rotating shaft facing the cover plate.

3. The wireless car charger mount according to claim 2, wherein the steering structure further comprises a first elastic member and a positioning member fixed to one end of the first elastic member; a positioning groove for the positioning member to clamp and fix is formed in a side surface of the rotating shaft; the other end of the first elastic member is fixedly arranged on an inner side surface of the recess; and the first elastic member is arranged between the rotating shaft and the inner side surface of the recess in an interference manner.

4. The wireless car charger mount according to claim 3, wherein the number of the first elastic members is equal to the number of the positioning members, and there are at least two first elastic members and at least two positioning members.

5. The wireless car charger mount according to claim 2, wherein the magnetic adsorption portion further comprises a linkage structure detachably connected to the two clamping members, and the linkage structure is disposed in a notch of the magnetic adsorption portion; and the second fixing holes accommodating the steering structure are respectively formed in both sides of the linkage structure.

6. The wireless car charger mount according to claim 5, wherein the linkage structure comprises a gear and two transmission shafts engaged with the gear; strip-shaped holes are respectively formed in the two transmission shafts, sawtooth structures are respectively provided on symmetric sides of the two strip-shaped holes, and the strip-shaped holes are arranged in parallel, are stacked outside the gear, and are separately engaged with the gear.

7. The wireless car charger mount according to claim 6, wherein two ends along a length direction of the strip-shaped holes are arc-shaped, a limiting member radially extends from an end of one strip-shaped hole, and the limiting member passes through the other strip-shaped hole, and a length of the limiting member is at most equal to a thickness of the other strip-shaped hole.

8. The wireless car charger mount according to claim 7, wherein the linkage structure further comprises a second elastic member; positioning columns are respectively provided on the two transmission shafts, and both ends of the second elastic member are respectively fixed on the two positioning columns; and the second elastic member elongates a length thereof when the transmission shafts move away from each other.

9. The wireless car charger mount according to claim 8, wherein any transmission shaft is provided with two positioning columns located on the vertical line, any two positioning columns on the two transmission shafts are located on a same horizontal line, and the second elastic member is sleeved outside the two positioning columns in a horizontal direction.

* * * * *